Dec. 7, 1965   R. J. HUMMEL   3,221,341

PLASTIC BIB CONSTRUCTION

Filed June 24, 1964

INVENTOR.
RAYMOND J. HUMMEL
BY
ATTORNEYS

United States Patent Office 3,221,341
Patented Dec. 7, 1965

3,221,341
PLASTIC BIB CONSTRUCTION
Raymond J. Hummel, Grand Rapids, Mich., assignor to H & H Plastics Mfg. Co., Grand Rapids, Mich., a corporation of Illinois
Filed June 24, 1964, Ser. No. 377,629
2 Claims. (Cl. 2—49)

This invention relates to bibs and more particularly to plastic bibs with attached tie straps.

This application is a continuation-in-part application of my co-pending application entitled Plastic Bibs and Method of Making, filed January 17, 1963, Serial No. 252,222, now U.S. Patent No. 3,146,465.

Moistureproof characteristics of plastic material make plastic bibs extremely advantageous. Yet, plastic bibs are normally expensive due to fabrication expenses. Fabrication is ordinarily expensive because of necessary steps to make the bibs fit comfortably on the user, and to make the tie straps securely attached. One real difficulty in forming plastic bibs on a mass production basis is the tendency for the tie straps on the resultant bibs to tear loose from the main body of the bib. If a shoulder support means is provided on the bibs as in the patent application noted above, for example, the problem is not significant. However, for adults, such shoulder areas area impractical, thereby causing the tie straps to be the sole means of support for the bib.

It is an object of this invention to provide a plastic bib that is disposable, is comfortable to wear, is formed inexpensively, and yet has securely held tie straps that do not readily tear loose. The disposable bib can be formed by mass production techniques, with its disposal after one use being completely economically justified.

Figure 1:
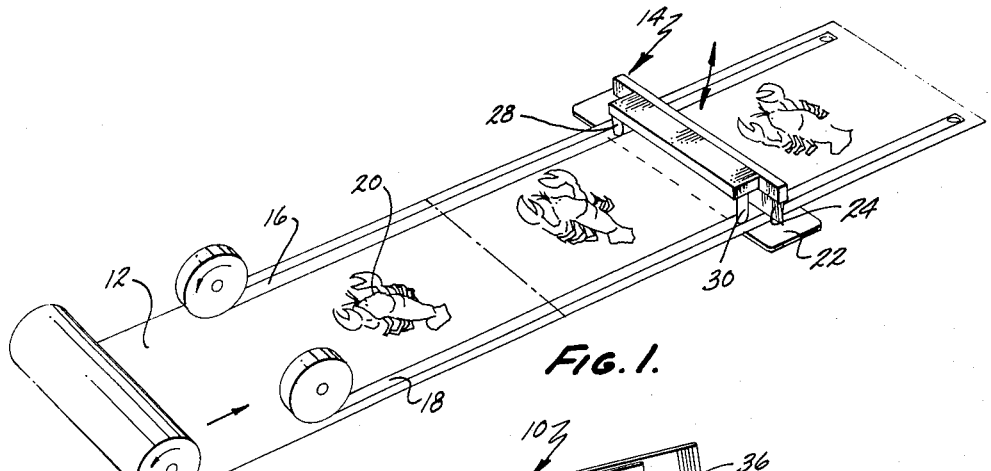
Figure 2:
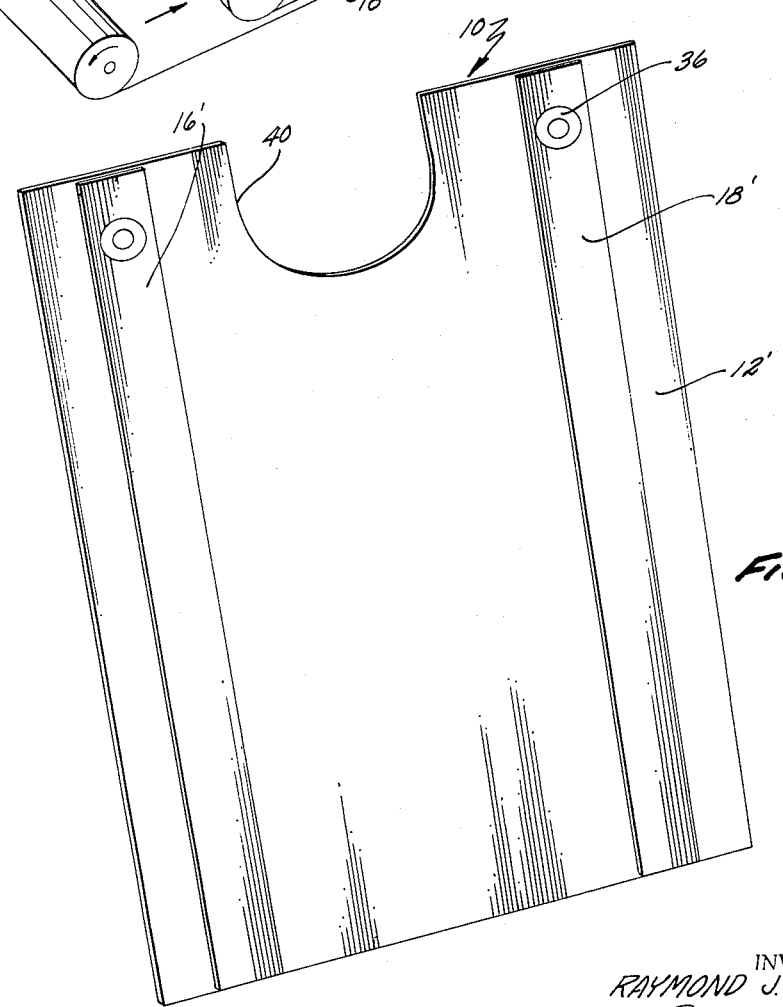

These and severaal other objects of this invention will become apparent upon studying the following specification in conjunction with the drawings in which:

FIG. 1 is a perspective view showing the method of fabrication of the novel bib; and FIG. 2 is a perspective view of the back side of the novel bib.

Referring specifically to the drawings, the individual bibs 10 are formed on a mass production basis according to the system illustrated in FIG. 1. A continuous roll 12 of thermoplastic fusible sheet material capable of being fusion bonded by "heat sealing" is unrolled continuously in the direction indicated by the arrow, toward the die assembly 14. Simultaneously, a pair of continuous thermoplastic, fusible strips 16 and 18 capable of being fusion bonded are unrolled and deposited along opposite edges of sheet material 12. The sheet material is printed with suitable decorative pattern 20 for each bib to be formed. A typical plastic is polyethylene.

As the sheet and strips pass over a support platen 22 and beneath the die assembly 14, the latter is reciprocated by suitable press mechanism (not shown) to simultaneously lower a cutting blade 24 against the sheet and strip to sever them, and lower a pair of elongated heated fusion dies 28 and 30 generally cylindrical in cross section against the strap portions.

Contact of the dies is adjacent blade 24 to fuse the upper ends of the straps to the adjacent sheet. By repeatedly severing and fusing the sheets and strips at uniformly spaced intervals, a plurality of bibs 10 is formed.

Each bib includes a body 12', which is a segment of sheet 12, and a pair of tie straps 16' and 18', which are segments of strips 16 and 18. Strip segments 16' and 18' have a length equal to that of the elongated body 12', since both ends of the straps are severed simultaneously with severing of the sheet.

Formerly, with the form of the invention illustrated in the above identified co-pending application, it was found that the fused tie straps tend to tear loose during use. The entire bib is useless if just one strap tears loose. After considerable experimentation it was found that the novel fusion pattern illustrated in FIG. 2 prevents this. The fusion pattern actually is an annulus 36 which extends almost to the edges of the strap width. The radial distance from the inner to the outer circumferences of the annulus is substantial, usually around $3/16$ of an inch, to provide a substantial area of fusion. It has been found that the circular outer periphery of the annulus effectively prevents tearing loose at the joint even though pulled at any angle. This is different from the straight line fusion previously practiced, since the ends of this joint tended to tear loose more readily. Once the tear started, severance was accelerated. With the circular outer periphery, however, a stress on the strap in any one direction is opposed at several different angles by the fusion pattern.

The fusion is annular in configuration rather than solidly circular, however, since it has been found that if the fusion is made solid, the heated die, when hot enough to fuse the plastic at the outer edges of the pattern, actually burns through the strap plastic at the center of the circle. This is apparently due to a concentration of the heat at this center area. Hence, for maximum strength without burning, or more accurately, melting through, an annular heated die is employed to provide an annular fusion pattern.

After the straps are fused, and the bib is cut to the length desired, a neck cut-out 40, generally semi-circular in configuration, is preferably formed as by die cutting or other cutting techniques. It will be noted that straps 16' and 18' straddle this neck cut-out, extending longitudinally along the length of the bib, with the annular fusion joints on opposite sides of the neck cut-out.

In use, when the tie straps are tied in place around the neck of the user, force is applied to the fusion joints, especially along its lower edge. With the annular fushion joint pattern employed, however, it has been found that the joint holds securely and does not break loose.

It is conceivable that certain minor details of the bib structure may be modified within the concept taught. Therefore, bibs with minor modifications are deemed to be within the scope of the coverage provided, if within the scope of the claims attached hereto.

I claim:
1. A disposable plastic bib comprising: an elongated thermoplastic sheet forming the body of said bib; a generally semi-circular cut-out in one end of said sheet; a pair of elongated thermoplastic tie straps on opposite sides of said cut-out, each having one end attached to said adjacent side of said sheet; and each strip attachment comprising an annular shaped fushion bond with an outer diameter slightly smaller than the width of the strip, and encircling an unfused, unbonded central circle of substantial size.

2. A disposable plastic bib comprising: a generally rectangular thermoplastic sheet having a length greater than its width; a centrally positioned, generally semi-circular neck cut-out in one end thereof; a pair of elongated thermoplastic tie strips on opposite sides of said cut-out and equal in length to said bib, extending from one end to the other; the ends of said strips adjacent said one end being fused to said sheet in a fushion pattern, said pattern being annular in configuration with an outer diameter slightly smaller than the width of the respective strip and an inner diameter of substantial size forming a central unfused area surrounded by the annular fusion pattern.

References Cited by the Examiner

UNITED STATES PATENTS

| | | | |
|---|---|---|---|
| 2,425,961 | 8/1947 | Shattuck | 2—49 |
| 2,511,809 | 6/1950 | Ryan | 2—111 |
| 2,620,480 | 12/1952 | Shea | 2—111 |
| 2,838,758 | 6/1958 | Townley | 2—49 |
| 2,949,611 | 8/1960 | Wilkaitis | 2—49 |

JORDAN FRANKLIN, *Primary Examiner.*